United States Patent
Swarts et al.

(10) Patent No.: US 7,865,202 B2
(45) Date of Patent: Jan. 4, 2011

(54) METHOD AND SYSTEM FOR I/Q BRANCH EQUALIZATION IN OFDM SYSTEMS

(75) Inventors: Francis Swarts, San Diego, CA (US); Mark Kent, Vista, CA (US); Theodoros Georgantas, Chaidari (GR)

(73) Assignee: Broadcom Corporation, Irvine, CA (US)

(*) Notice: Subject to any disclaimer, the term of this patent is extended or adjusted under 35 U.S.C. 154(b) by 93 days.

(21) Appl. No.: 12/251,774

(22) Filed: Oct. 15, 2008

(65) Prior Publication Data

US 2009/0213724 A1 Aug. 27, 2009

Related U.S. Application Data

(60) Provisional application No. 61/031,977, filed on Feb. 27, 2008, provisional application No. 61/092,961, filed on Aug. 29, 2008.

(51) Int. Cl.
*H04B 15/00* (2006.01)
(52) U.S. Cl. .................... 455/504; 455/67.16; 455/284; 455/295
(58) Field of Classification Search ................ 370/203, 370/206, 207, 210, 215; 455/67.11, 67.13, 455/67.16, 226.1, 130, 269, 280, 283, 284, 455/295, 296, 313, 323, 325, 326, 39, 500, 455/501, 504
See application file for complete search history.

(56) References Cited

U.S. PATENT DOCUMENTS

| | | | |
|---|---|---|---|
| 6,535,715 B2* | 3/2003 | Dapper et al. .............. 455/3.05 |
| 6,628,735 B1* | 9/2003 | Belotserkovsky et al. ... 375/355 |
| 7,570,923 B2* | 8/2009 | Kiss et al. ................ 455/67.14 |

* cited by examiner

*Primary Examiner*—Chi H Pham
*Assistant Examiner*—Weibin Huang
(74) *Attorney, Agent, or Firm*—McAndrews, Held & Malloy, Ltd.

(57) ABSTRACT

Aspects of a method and system for I/Q branch equalization in OFDM systems may include determining a transfer function mismatch between an in-phase processing branch, and/or a quadrature processing branch in an OFDM receiver. The determined transfer function mismatch may be compensated for, by applying equalization after a fast Fourier transform (FFT) in an in-phase processing branch and/or a quadrature processing branch. The OFDM system may be compliant with, for example, UMTS LTE (EUTRA), WiMAX (IEEE 802.16), DVB-H, and WLAN (IEEE 802.11). A transfer function may be measured for an in-phase branch filter and/or quadrature branch filter to determine the transfer function mismatch. The transfer function mismatch may be compensated for, in frequency domain by the equalizer. The transfer function mismatch may comprise magnitude and/or phase response mismatch, wherein the magnitude and/or phase response mismatch may be a function of frequency.

32 Claims, 8 Drawing Sheets

METHOD AND SYSTEM FOR I/Q BRANCH EQUALIZATION IN OFDM SYSTEMS

CROSS-REFERENCE TO RELATED APPLICATIONS/INCORPORATION BY REFERENCE

This application makes reference to, claims priority to, and claims the benefit of U.S. Provisional Application Ser. No. 61/031,977, filed on Feb. 27, 2008 and U.S. Application Ser. No. 61/092,961, filed on Aug. 29, 2008.

This application also makes reference to:
U.S. application Ser. No. 12/251,815, filed on even date herewith.

Each of the above referenced applications is hereby incorporated herein by reference in its entirety.

FIELD OF THE INVENTION

Certain embodiments of the invention relate to wireless communication systems. More specifically, certain embodiments of the invention relate to a method and system for I/Q branch equalization in OFDM systems.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink.

In order to meet these demands, communication systems may become increasingly complex and increasingly miniaturized. It may hence be important to strive for solutions that may reduce, for example, the system complexity while offering high performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for I/Q branch equalization in OFDM systems substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for I/Q branch equalization in Orthogonal Frequency Division Multiplexing (OFDM) systems. Aspects of a method and system for I/Q branch equalization in Orthogonal Frequency Division Multiplexing (OFDM) systems may comprise determining a transfer function mismatch between an in-phase processing branch, and/or a quadrature processing branch in an OFDM receiver. The determined transfer function mismatch may be compensated for, by applying equalization after a fast Fourier transform (FFT) in an in-phase processing branch and/or a quadrature processing branch.

The OFDM system may be compliant with a wireless standard. The wireless standard may comprise UMTS LTE (EUTRA), WiMAX (IEEE 802.16), DVB-H, and/or WLAN (IEEE 802.11). A transfer function may be measured for an in-phase branch filter and/or a quadrature branch filter for the determining of the transfer function mismatch. The transfer function mismatch may be compensated for, in frequency domain by the equalizer. The transfer function mismatch may comprise magnitude and/or phase response mismatch, wherein the magnitude and/or phase response mismatch may be a function of frequency. The communication signals may be QPSK, QAM16, and/or QAM64 modulated OFDM signals. A transfer function may be determined and utilized for the equalization, $R(\omega)$, by forming a quotient $$R(\omega) = \frac{H_I(\omega)}{H_Q(\omega)}$$

from a transfer function of the in-phase processing branch, $H_I(\omega)$, and a transfer function of the quadrature processing branch, $H_Q(\omega)$. Also, a transfer function may be determined and utilized for the equalization, $R(\omega)$, by forming a quotient $$R(\omega) = \frac{H_Q(\omega)}{H_I(\omega)}$$

from a transfer function of the in-phase processing branch, $H_I(\omega)$, and a transfer function of the quadrature processing branch, $H_Q(\omega)$.

Figure 1A:
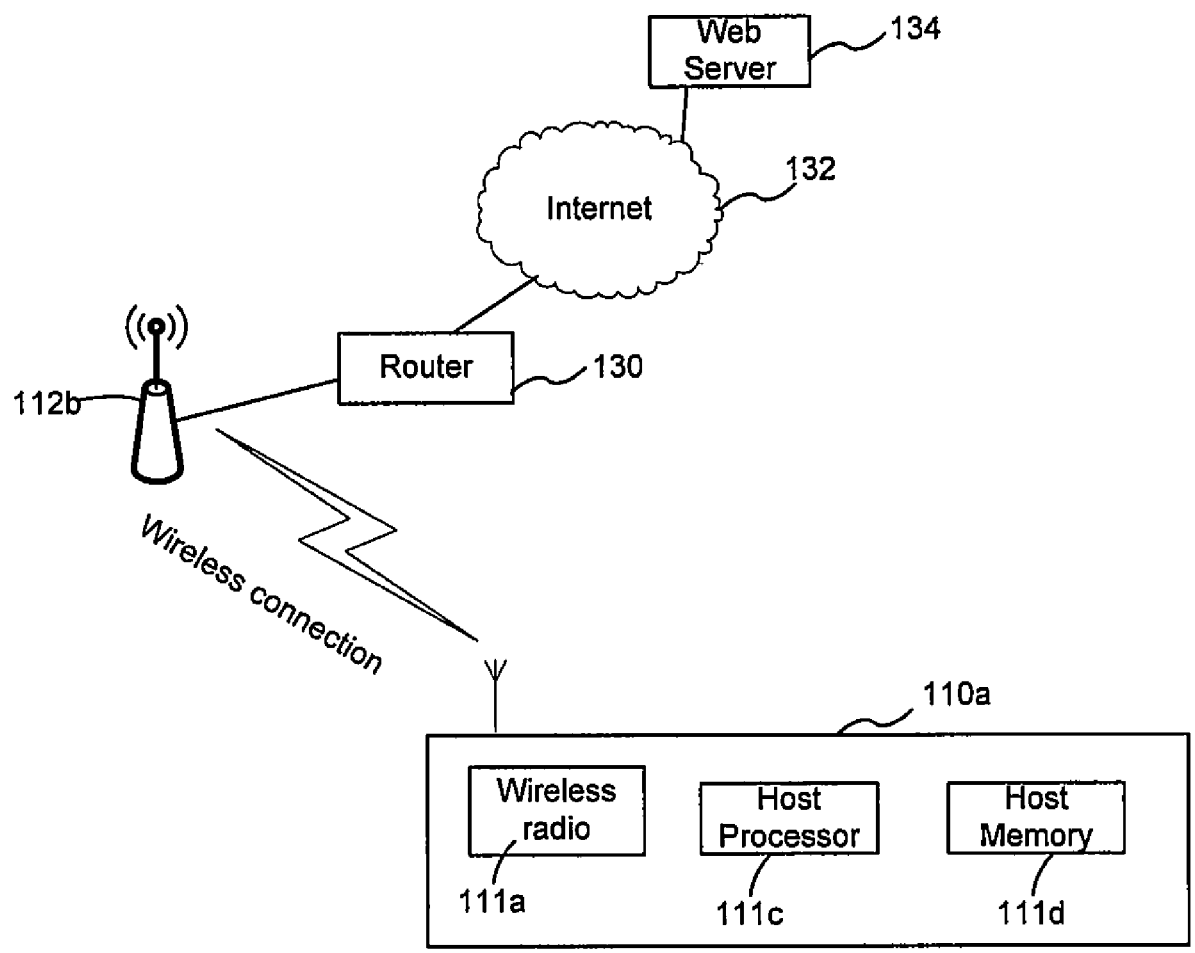
FIG. 1A is a diagram illustrating an exemplary wireless communication system, in accordance with an embodiment of the invention.

FIG. 1A is a diagram illustrating an exemplary wireless communication system, in accordance with an embodiment of the invention. Referring to FIG. 1A, there is shown an access point 112b, a computer 110a, a router 130, the Internet 132 and a web server 134. The computer or host device 110a may comprise a wireless radio 111a, a host processor 111c, and a host memory 111d. There is also shown a wireless connection between the wireless radio 111a and the access point 112b.

The access point 112b may comprise suitable logic, circuitry and/or code that may be enabled to transmit and receive radio frequency signals for data communications, for example with the wireless radio 111a. The access point 112b may also be enabled to communicate via a wired network, for example, with the router 130. The wireless radio 111a may comprise suitable logic, circuitry and/or code that may enable communications over radio frequency waves with one or more other radio communication devices. The wireless radio 111a and the access point 112b may be compliant with one or more communication standards, for example, GSM, UMTS LTE, CDMA2000, Bluetooth, WiMAX (IEEE 802.16), and/or IEEE 802.11 Wireless LAN.

The host processor 111c may comprise suitable logic, circuitry and/or code that may be enabled to generate and process data. The host memory 111d may comprise suitable logic, circuitry and/or code that may be enabled to store and retrieve data for various system components and functions of the computer 110a.

The router 130 may comprise suitable logic, circuitry and/or code that may be enabled to communicate with communication devices that may be communicatively coupled to it, for example the access point 112b and/or one or more communication devices that may be communicatively coupled to the Internet 132.

The Internet 132 may comprise suitable logic, circuitry and/or code that may be enabled to interconnect and exchange data between a plurality of communication devices. The web server 134 may comprise suitable logic, circuitry and/or code that may be enabled to communicate with communication devices that may be communicatively coupled to it via, for example the Internet 132.

Various computing and communication devices comprising hardware and software may be enabled to communicate using one or more wireless communication standards and/or protocols. For example, a user of the computer or host device 110a may access the Internet 132 in order to consume streaming content from the Web server 134. Accordingly, the user may establish a wireless connection between the computer 110a and the access point 112b. Once this connection is established, the streaming content from the Web server 134 may be received via the router 130, the access point 112b, and the wireless connection, and consumed by the computer or host device 110a.

In many communication devices, the in-phase (I) channel and the quadrature (Q) channel may be processed separately. Because of component variation, and/or slight mismatch due to fixed hardware that may be operated on multiple communication protocols and/or frequencies, there may be instances when the I-channel and Q-channel processing chains may not be identical. This mismatch may affect communication performance. Various embodiments of the invention may be operable to compensate for mismatch between the I-channel and Q-channel, in accordance with various embodiments of the invention. In this regard, a transfer function mismatch between an in-phase processing branch, and/or a quadrature processing branch of an OFDM receiver may be determined. The determined transfer function mismatch may be compensated for, by applying equalization after a fast Fourier transform (FFT) in an in-phase processing branch and/or a quadrature processing branch.

Figure 1B:
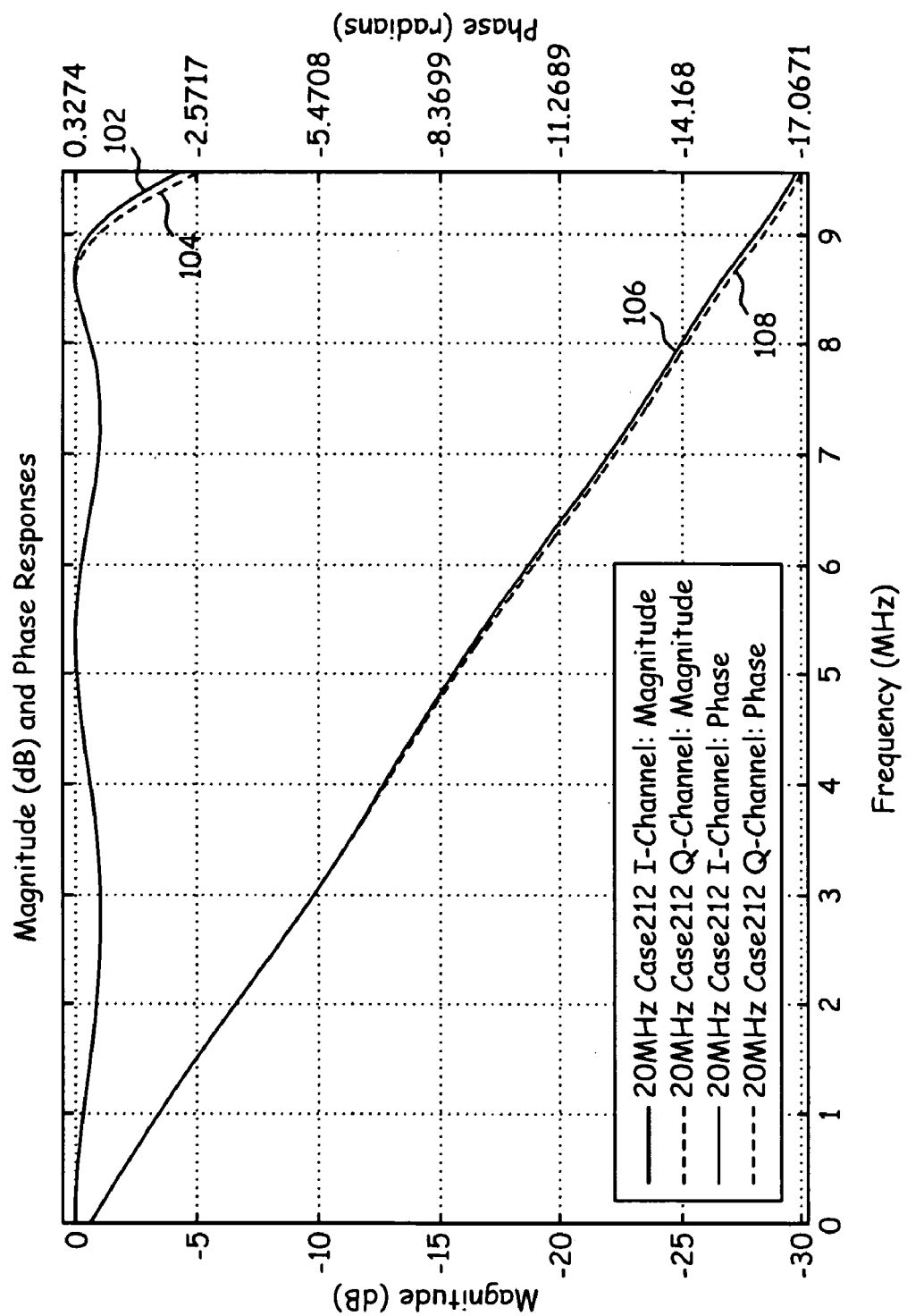
FIG. 1B is a diagram illustrating an exemplary transfer function comparison for I and Q branch analog baseband filters, in accordance with various embodiments of the invention.

FIG. 1B is a diagram illustrating an exemplary transfer function comparison for I and Q branch analog baseband filters, in accordance with various embodiments of the invention. There is shown a 20 MHz case 212 I channel magnitude plot (I-magnitude) 102, a 20 MHz case 212 Q channel magnitude plot (Q-magnitude) 104, a 20 MHz case 212 I channel phase plot (I-phase) 106, and a 20 MHz case 212 Q channel phase plot 108. The 20 MHz case 212 I channel phase plot (I-phase) 106, and the 20 MHz case 212 Q channel phase plot 108 illustrates that a filter mismatch may exist between an in-phase and a quadrature filter. The exemplary channel bandwidth may be 20 MHz.

In many communication systems, complex valued signals may be employed, comprising a real (in-phase, I) and an imaginary (quadrature, Q) part. The received signal paths may be treated as two real valued branches in the receiver, thereby enabling the receiver to process the in-phase and quadrature signal components separately. Hence, desirable filtering of these signals may be implemented via a plurality of filters, often with substantially similar transfer characteristics applied to each of the branches (I and Q) individually. Due to slight component variations in the I and Q branch filters, the filter transfer characteristics may vary slightly, and may introduce signal distortion in the resultant complex valued signal after filtering, which may affect the performance of the receiver, especially for higher-order modulation schemes in OFDM systems, for example.

In accordance with various embodiments of the invention, a correction factor may be applied to at least one of the in-phase and/or quadrature signal branches in an OFDM system, for example, in order to equalize and/or significantly attenuate a mismatch in signal transfer characteristics that may exist between the signal branches. In particular, it may be desirable to equalize a mismatch between the transfer characteristics of a plurality of analog baseband filters that may be in an analog front-end of a receiver. In accordance with various embodiments of the invention, the invention may not be limited to equalization of components within the front-end of receivers, but may be applied to equalize gain and/or phase mismatches that may exist between the I and Q branches of an arbitrary signal processing system.

As illustrated in FIG. 1B, an exemplary analog baseband filter, may be characterized by a transfer function comprising a magnitude and a phase transfer function. For example, an in-phase filter may be characterized by an I-magnitude 102 plot and an I-phase 106 plot. Similarly, a quadrature filter may be characterized by a Q-magnitude plot 104 and a Q-phase plot 108. As may be observed from FIG. 1B, the I-phase 106 plot and the Q-phase 108 plot, and the I-magnitude 102 plot and the Q-magnitude 104 plot, respectively, may be similar but, in most cases, may be different due to filter mismatch. The difference between the plots 102 and 104, and the plots 106 and 108, respectively, may illustrate the magnitude and phase mismatch, respectively.

Figure 2A:
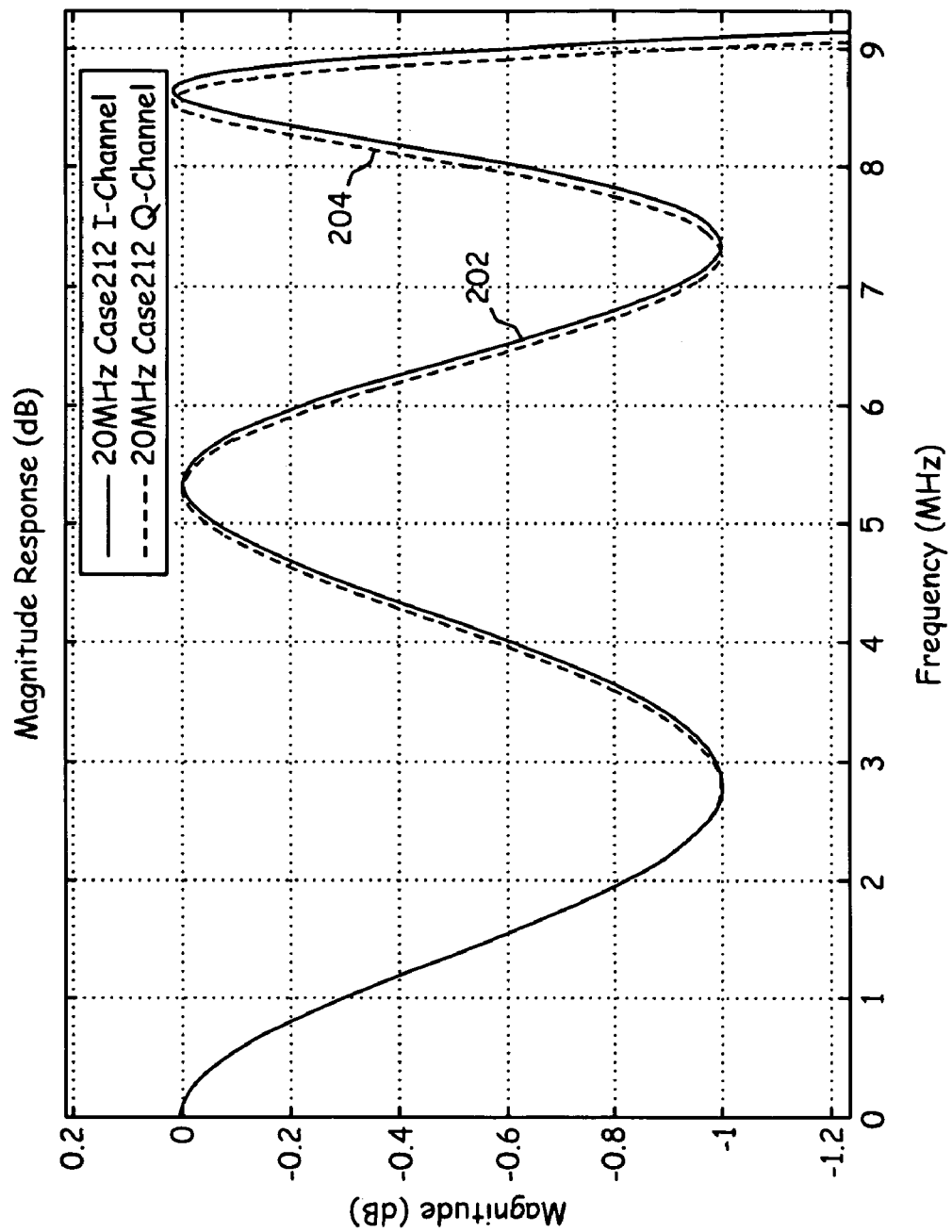
FIG. 2A is a diagram illustrating exemplary mismatch detail for I/Q filter magnitude response, in accordance with various embodiments of the invention.

FIG. 2A is a diagram illustrating exemplary mismatch detail for I/Q filter magnitude response, in accordance with various embodiments of the invention. There is shown a 20 MHz case 212 I-channel (I-magnitude) plot 202, and a 20 MHz 212 Q-channel (Q-magnitude) plot 204. Case 212 of FIG. 2A may denote that a filter mismatch may exist between an in-phase and a quadrature filter. The exemplary channel bandwidth may be 20 MHz.

In accordance with various embodiments of the invention, FIG. 2A may illustrate an amplitude mismatch between an in-phase channel magnitude filter transfer function, depicted by the I-magnitude plot 202, and a quadrature channel magnitude filter transfer function, depicted by the Q-magnitude plot 204. The I-magnitude 202 may be substantially similar to I-magnitude 102, and the Q-magnitude 204 may be substantially similar to Q-magnitude 104.

In accordance with various embodiments of the invention, a gain and phase characterization of the in-phase analog baseband filter and the quadrature analog baseband filter of the receiver front-end may be desirable. In most instances, it may be desirable to employ a substantially similar measurement method to measure the filter transfer functions for both the in-phase and the quadrature filters. A similar measurement technique and/or measurement setup may be utilized to enhance the comparability of the obtained transfer function measurements. For example, after obtaining the in-phase transfer function $H_I(\omega)$ and quadrature filter transfer function $H_Q(\omega)$, for the I and Q branch filters respectively, the relative transfer characteristics $R(\omega)$ of the two filters may be given by the following relationship:

$$R(\omega) = \frac{H_I(\omega)}{H_Q(\omega)}$$

Because an OFDM system may operate in the frequency domain, the relative transfer characteristics of the filter in the frequency domain, $R(\omega)$, may be applied as a correction factor to the Q branch of the receiver after the Fast-Fourier Transform (FFT) of the received signal may have been obtained. Hence, the correction factors due to the relative transfer characteristics $R(\omega)$ may act as an I/Q branch equalizer for the filter transfer characteristic mismatch. In some instances, it may be desirable to equalize the I-branch rather than the Q-branch. In some instances, this may be achieved by applying correction factors that may be obtained from $R^{-1}(\omega) = H_Q(\omega)/H_I(\omega)$.

For example, the received time domain OFDM signal, rx(t), may be given by the following relationship:

$$rx(t) = i(t) + jq(t)$$

The frequency domain representation of this signal may be obtained by computing the Fourier transform:

$$\Im(rx(t)) = \Im(i(t) + jq(t))$$
$$= \Im(i(t)) + j\Im(q(t))$$
$$= I_{real}(\omega) - Q_{imag}(\omega) + j(I_{imag}(\omega) + Q_{real}(\omega))$$

where $I_{real}(\omega)$, $I_{imag}(\omega)$, and $Q_{real}(\omega)$. $Q_{imag}(\omega)$ may represent the real and imaginary parts of the Fourier transform of i(t) and q(t), respectively.

As described above, the relative transfer characteristics $R(\omega)$ may be applied as correction factors to, for example, the Q-branch at the point in the receiver where the Fourier transform of the received signal may have been computed, in accordance with the following relationship:

$$\Im(rx(t))_{eq} = \Im(i(t) + jq(t))$$
$$= \Im(i(t)) + j\Im(q(t))$$
$$= I(\omega) + jQ(\omega)R(\omega)$$
$$= I_{real}(\omega) - Q_{real}(\omega)R_{imag}(\omega) - Q_{imag}(\omega)R_{real}(\omega) +$$
$$j(I_{imag}(\omega) + Q_{real}(\omega)R_{real}(\omega) - Q_{imag}(\omega)R_{imag}(\omega))$$

where $R(\omega) = R_{real}(\omega) + jR_{imag}(\omega)$.

Figure 2B:
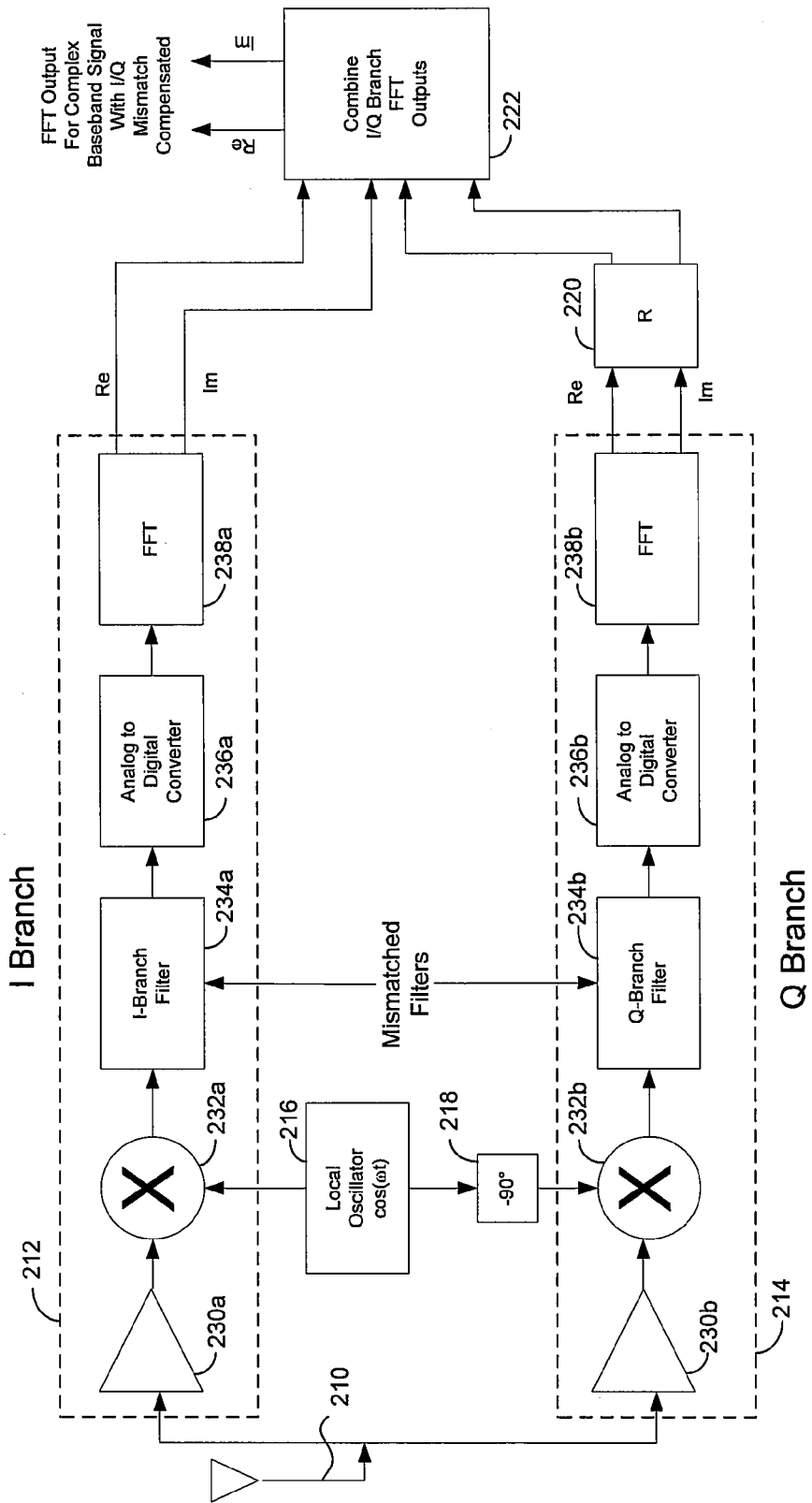
FIG. 2B is a diagram illustrating an exemplary I/Q branch equalization system, in accordance with an embodiment of the invention.

FIG. 2B is a diagram illustrating an exemplary I/Q branch equalization system, in accordance with an embodiment of the invention. Referring to FIG. 2B, there is shown an antenna 210, an in-phase (I) branch 212, a quadrature (Q) branch 214, a local oscillator 216, a phase shift block 218, an equalizer 220, and a combiner 222. The I-branch 212 may comprise an amplifier 230a, a multiplier 232a, an I-branch filter 234a, an analog-to-digital converter (ADC) 236a, and a fast Fourier transform (FFT) block 238a. The Q-branch 214 may comprise an amplifier 230b, a multiplier 232b, a Q-branch filter 234b, an analog-to-digital converter (ADC) 236b, and a fast Fourier transform (FFT) block 238b.

The antenna 210 may comprise suitable logic, circuitry and/or code that may be enabled to receive electromagnetic waves of radio-frequency (RF) signals, and may convert them to a voltage and/or current signal. The I-branch 212 may comprise suitable logic, circuitry and/or code that may be enabled to accept radio-frequency and convert them to suitable baseband and/or intermediate frequency signals, for further processing. The Q-branch 214 may be substantially similar to the I-branch 212 and may comprise suitable logic, circuitry and/or code that may be enabled to accept radio-frequency and convert them suitable baseband and/or intermediate frequency signals, for further processing. The local oscillator 216 may comprise suitable logic, circuitry and/or code that may be enabled to generate a radio-frequency carrier signal, which may be used to demodulate a received RF-signal from antenna 210, for example. The phase shift block 218 may comprise suitable logic, circuitry and/or code that may be enabled to suitably delay an input signal, to generate a 90 degrees phase-shift.

The combiner 222 may comprise suitable logic, circuitry and/or code that may be enabled to combine real and imaginary signal components to generate composite real and imaginary signals. The amplifiers 230a/b may comprise suitable logic, circuitry and/or code that may be enabled to amplify and/or filter a radio-frequency signal. In accordance with various embodiments of the invention, the amplifiers 230a and 230b may be a single amplifier with a split output, in some instances. The multipliers 232a/b may comprise suitable logic, circuitry and/or code that may be enabled to multiply a plurality of input signals, and generate an output signal which may be proportional to the product of the plurality of input signals. The I-branch filter 234a and the Q-branch filter 234b may comprise suitable logic, circuitry and/or code that may be enabled to attenuate certain frequencies of an input signal, in its output signal. The ADC 236a/b may comprise suitable logic, circuitry and/or code that may be enabled to convert an analog signal to a digital output signal. The FFT blocks 238a/b may comprise suitable logic, circuitry and/or code that may be enabled to compute a fast Fourier transform of an input signal, and generate a (generally) complex output signal.

An RF signal may be received at antenna 210. The received signal may be communicatively coupled to the inputs of the I-branch 212, for in-phase processing, and the Q-branch 214, for quadrature processing. In the I-branch 212, the RF signal may be amplified and/or filtered at the amplifier 230. The amplified signal at the output of the amplifier 230a may be multiplied with, for example, a carrier signal cos(ωt), to demodulate the RF signal to intermediate frequency and/or to baseband. The output of multiplier 232a may be coupled to the I-branch filter 234a, which may remove undesirable frequency components from its input signal. The output signal of the I-branch filter 234a may be converted from an analog signal to a discrete time signal in the ADC 236a. The discretized signal generated in the ADC 236a may be communicatively coupled to the FFT block 238a, which may generate an output signal proportional to the fast Fourier transform of its input signal. The resulting signal may generally be complex, and the FFT block 238b may generate an output for the real signal component, and the complex signal component, respectively.

The Q-branch 214 may operate substantially similar to the I-branch, and may process RF signals to extract and process the quadrature channel. In multiplier 232b, an RF signal may be multiplied with a 90 degree phase-shifted carrier signal, for example cos(ωt−90 deg). The output of the multiplier 232b may be filtered and frequency-limited in the Q-branch filter 234b. The transfer characteristics of the I-branch filter 234a, $H_I(\omega)$, may be mismatched to the transfer characteristics of the Q-branch filter 234b, $H_Q(\omega)$, for example, as described for FIG. 2B. Thus, the equalizer 220 may be implemented with a transfer function $R(\omega)$, as described for FIG. 2B, for example. The equalizer 220 may equalize the mismatch between the I-branch filter 234a and the Q-branch filter 234b. In the combiner 222, the output signal from the I-branch 212 may be combined with the equalized output signal from the Q-branch 214, which may be obtained at the output of the equalizer 220. In accordance with various embodiments of the invention, one or more equalizers may be used in the I-branch and/or the Q-branch.

Figure 3:
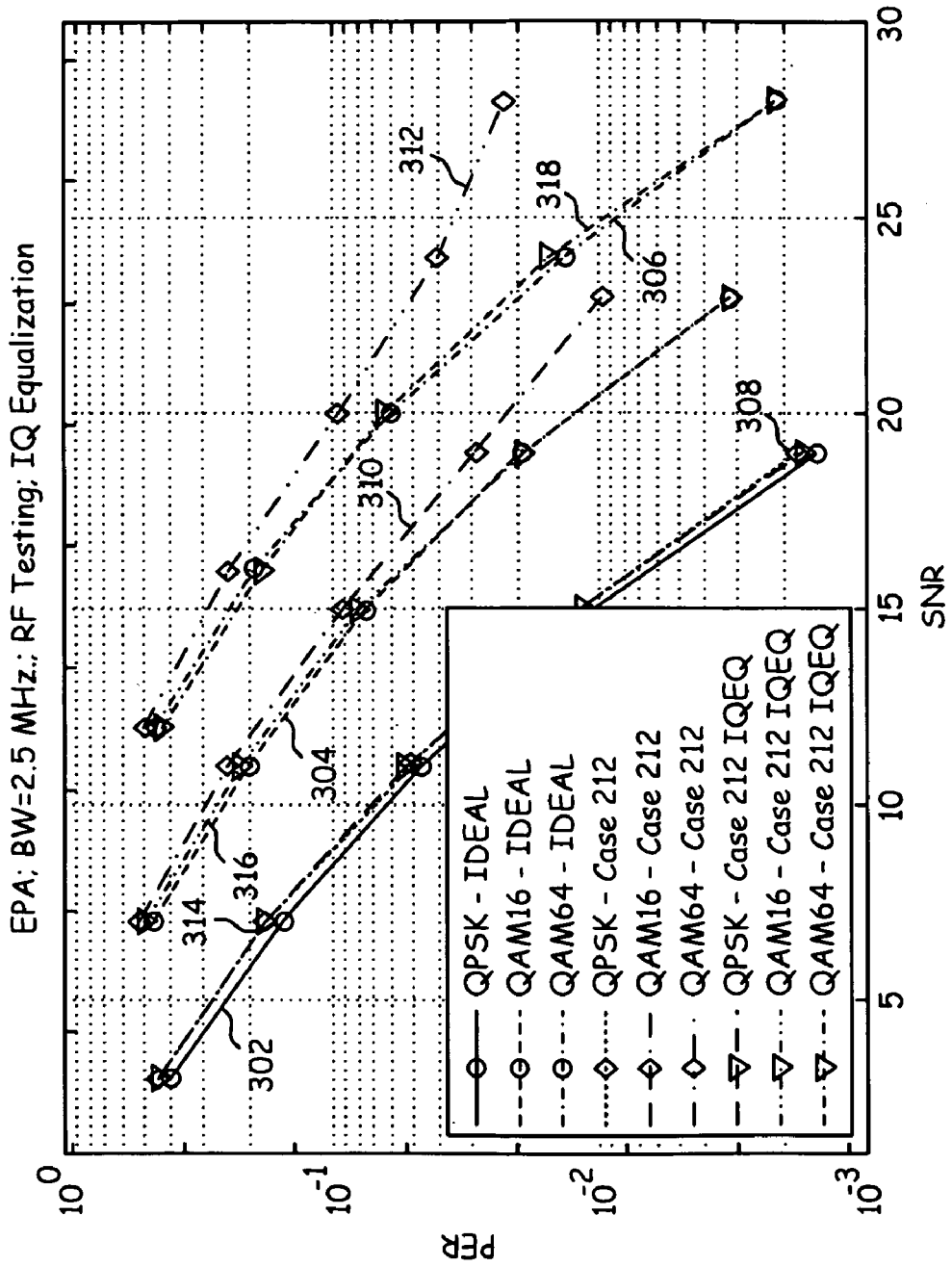
FIG. 3 is a diagram illustrating an exemplary 2.5 MHz EUTRA system performance with/without mismatched filters, in accordance with various embodiments of the invention.

FIG. 3 is a diagram illustrating an exemplary 2.5 MHz EUTRA system performance with/without mismatched filters, in accordance with various embodiments of the invention. There is shown a QPSK IDEAL plot 302, a QAM16 IDEAL plot 304, a QAM64 IDEAL plot 306, a QPSK case 212 plot 308, a QAM16 case 212 plot 310, a QAM64 case 212 plot 312, a QPSK case 212 IQEQ plot 314, a QAM16 case 212 IQEQ plot 316, a QAM64 case 212 IQEQ plot 318. With reference to FIG. 3, the QPSK case 212 plot 308, the QAM16 case 212 plot 310, the QAM64 case 212 plot 312 may be collectively referred to as case 212. Additionally, the QPSK case 212 IQEQ plot 314, the QAM16 case 212 IQEQ plot 316, and the QAM64 case 212 IQEQ plot 318 may be collectively referred to as case 212 IQEQ. FIG. 3 illustrates the Packet-Error-Rate (PER) as a function of Signal-to-Noise-Ratio (SNR) for a plurality of modulation orders, for example Quadrature phase shift keying (QPSK), and Quadrature Amplitude Modulation (QAM) for orders 4 (QAM16) and 6 (QAM64). IDEAL may denote an exemplary scenario without filter mismatch between the I-branch and the Q-branch. The case 212 of FIG. 3 may denote an exemplary scenario with an I-branch and a Q-branch mismatch, and the case 212 IQEQ of FIG. 3 may denote an exemplary PER performance by using equalization in accordance with various embodiments of the invention.

As may be seen from FIG. 3, for any modulation order, the IDEAL scenario may perform at lower PER than the case 212 of FIG. 3 scenario. In particular, the effect may be significantly more pronounced for higher order modulation, as may be illustrated by comparing no-mismatch QAM64 IDEAL plot 306, with QAM64 case 212 plot 312 of FIG. 3. By applying an exemplary equalization technique in accordance with various embodiments of the invention, the performance may be improved from the QAM64 case 212 plot 312 to the QAM64 case 212 IQEQ plot 318 of FIG. 3. As may be observed, the QAM64 case 212 IQEQ plot 318 of FIG. 3 may be relatively close to the performance that may be achieved without mismatch as illustrated by the QAM64 IDEAL plot 306 of FIG. 3.

Figure 4:
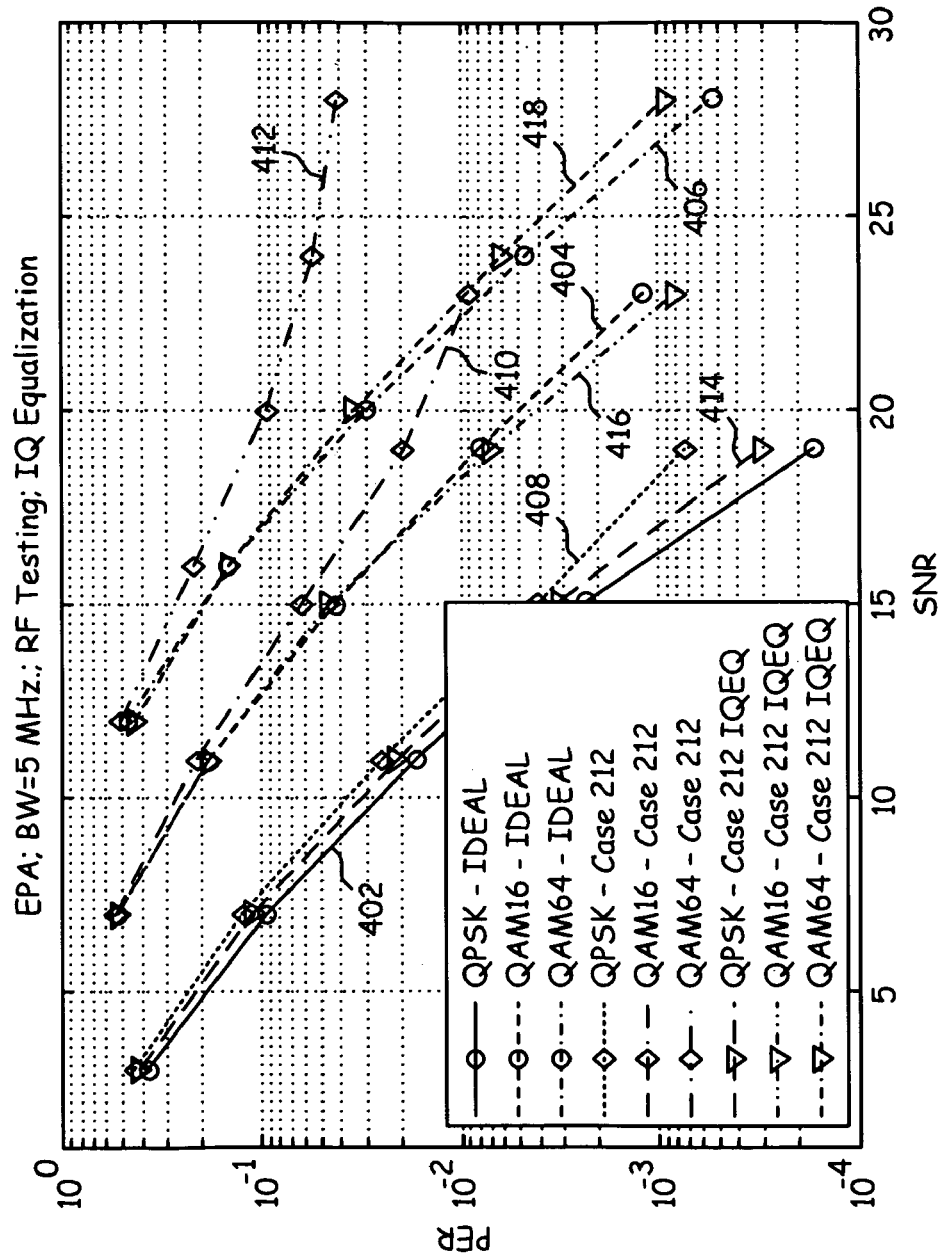
FIG. 4 is a diagram illustrating an exemplary 5 MHz EUTRA system performance with/without mismatched filters, in accordance with various embodiments of the invention.

FIG. 4 is a diagram illustrating an exemplary 5 MHz EUTRA system performance with/without mismatched filters, in accordance with various embodiments of the invention. There is shown a QPSK IDEAL plot 402, a QAM16 IDEAL plot 404, a QAM64 IDEAL plot 406, a QPSK case 212 plot 408, a QAM16 case 212 plot 410, a QAM64 case 212 plot 412, a QPSK case 212 IQEQ plot 414, a QAM16 case 212 IQEQ plot 416, a QAM64 case 212 IQEQ plot 418. FIG. 4 may illustrate the Packet-Error-Rate (PER) as a function of Signal-to-Noise-Ratio (SNR) for a plurality of modulation orders, for example Quadrature phase shift keying (QPSK), and Quadrature Amplitude Modulation (QAM) for orders 4 (QAM16) and 6 (QAM64). IDEAL may denote an exemplary scenario without filter mismatch between the I-branch and the Q-branch. Case 212 of FIG. 4 may denote an exemplary scenario with an I-branch and a Q-branch mismatch, and case 212 IQEQ of FIG. 4 may denote an exemplary PER performance by using equalization in accordance with various embodiments of the invention.

As may be seen from FIG. 4, for any modulation order, the IDEAL scenario may perform at lower PER than the case 212 of FIG. 4 scenario. In particular, the effect may be significantly more pronounced for higher order modulation, as may be illustrated by comparing no-mismatch QAM64 IDEAL plot 406, with QAM64 case 212 plot 412 of FIG. 4. By applying an exemplary equalization technique in accordance with various embodiments of the invention, the performance may be improved from QAM64 case 212 plot 412 to QAM64 case 212 IQEQ plot 418. As may be observed, QAM64 case 212 IQEQ plot 418 may be relatively close to the performance that may be achieved without mismatch as illustrated by QAM64 IDEAL plot 406, as illustrated in FIG. 4.

Figure 5:
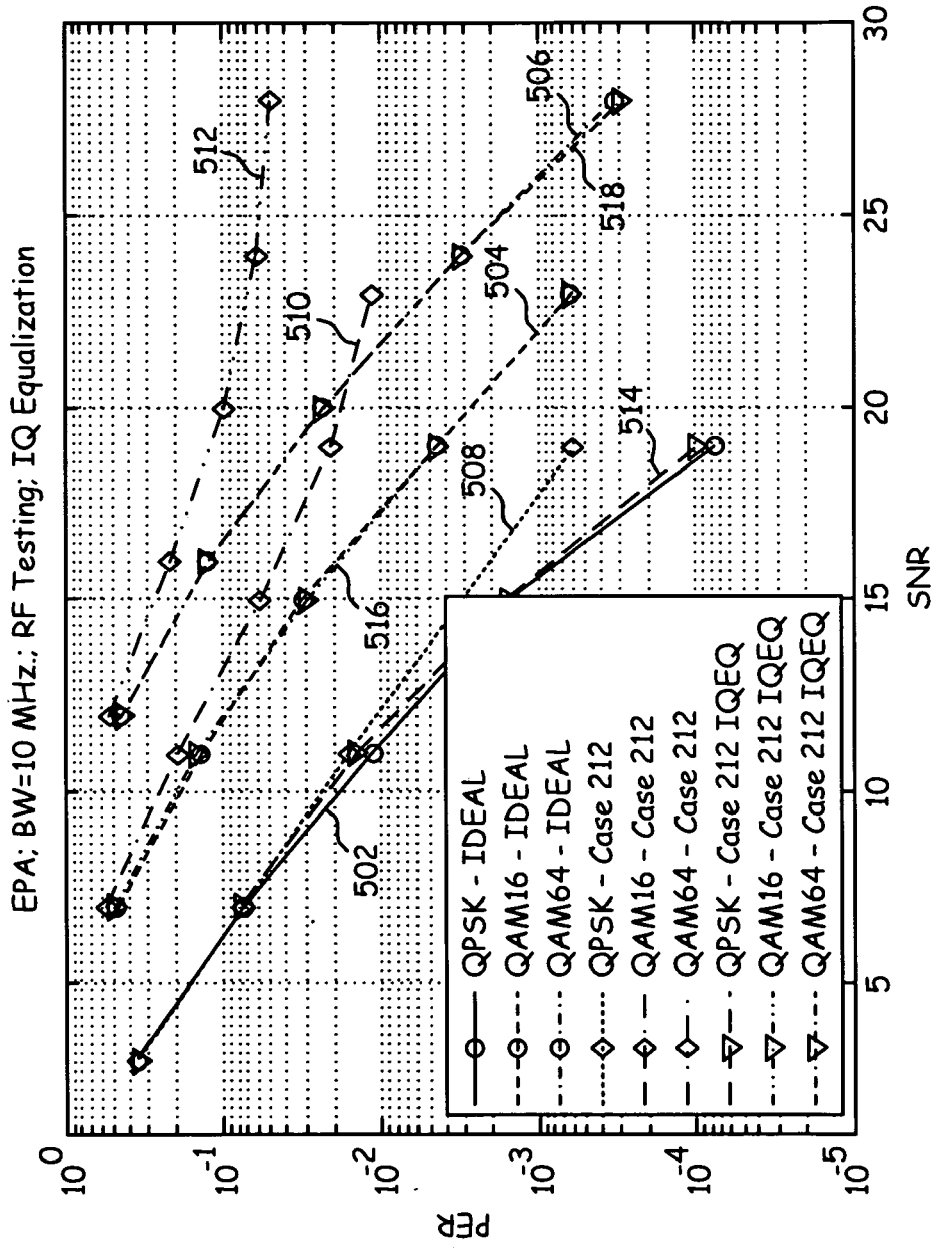
FIG. 5 is a diagram illustrating an exemplary 10 MHz EUTRA system performance with/without mismatched filters, in accordance with various embodiments of the invention.

FIG. 5 is a diagram illustrating an exemplary 10 MHz EUTRA system performance with/without mismatched filters, in accordance with various embodiments of the invention. There is shown a QPSK IDEAL plot 502, a QAM16 IDEAL plot 504, a QAM64 IDEAL plot 506, a QPSK case 212 plot 508, a QAM16 case 212 plot 510, a QAM64 case 212 plot 512, a QPSK case 212 IQEQ plot 514, a QAM16 case 212 IQEQ plot 516, a QAM64 case 212 IQEQ plot 518. FIG. 5 may illustrate the Packet-Error-Rate (PER) as a function of Signal-to-Noise-Ratio (SNR) for a plurality of modulation orders, for example Quadrature phase shift keying (QPSK), and Quadrature Amplitude Modulation (QAM) for orders 4 (QAM16) and 6 (QAM64). IDEAL may denote an exemplary scenario without filter mismatch between the I-branch and the Q-branch. Case 212 of FIG. 5 may denote an exemplary scenario with an I-branch and a Q-branch mismatch, and case 212 IQEQ of FIG. 5 may denote an exemplary PER performance by using equalization in accordance with various embodiments of the invention.

As may be seen from FIG. 5, for any modulation order, the IDEAL scenario may perform at lower PER than the case 212 scenario of FIG. 5. In particular, the effect may be significantly more pronounced for higher order modulation, as may be illustrated by comparing no-mismatch QAM64 IDEAL plot 506, with QAM64 case 212 plot 512. By applying an exemplary equalization technique in accordance with various embodiments of the invention, the performance may be improved from QAM64 case 212 plot 512 to QAM64 case 212 IQEQ plot 518. As may be observed, QAM64 case 212 IQEQ plot 518 may be relatively close to the performance that may be achieved without mismatch as illustrated by QAM64 IDEAL plot 506 of FIG. 5. In some instances, the performance in accordance with various embodiments of the invention may be substantially similar to the performance without mismatch.

Figure 6:
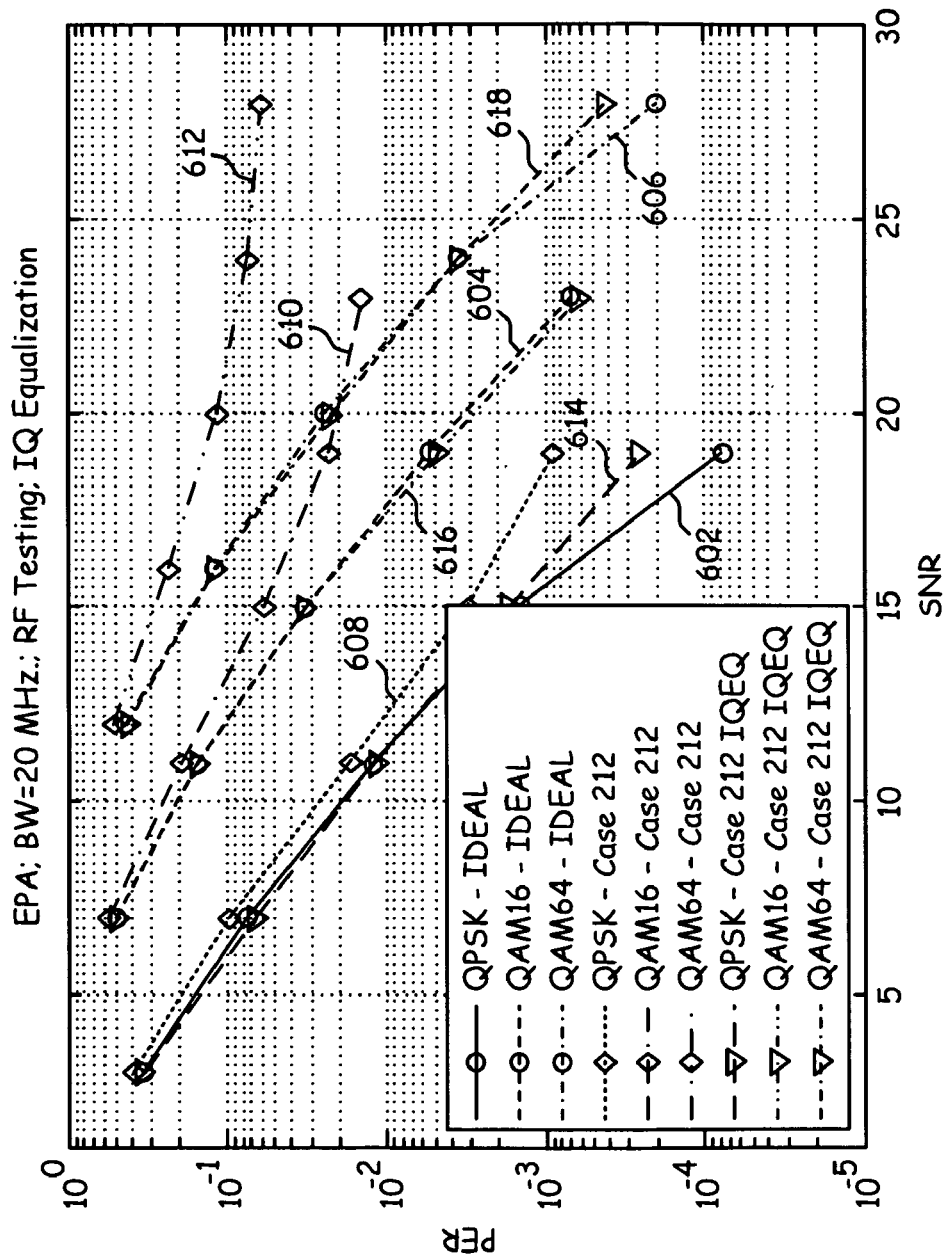
FIG. 6 is a diagram illustrating an exemplary 20 MHz EUTRA system performance with/without mismatched filters, in accordance with various embodiments of the invention.

FIG. 6 is a diagram illustrating an exemplary 20 MHz EUTRA system performance with/without mismatched filters, in accordance with various embodiments of the invention. There is shown a QPSK IDEAL plot 602, a QAM16 IDEAL plot 604, a QAM64 IDEAL plot 606, a QPSK case 212 plot 608, a QAM16 case 212 plot 610, a QAM64 case 212 plot 612, a QPSK case 212 IQEQ plot 614, a QAM16 case 212 IQEQ plot 616, a QAM64 case 212 IQEQ plot 618. FIG. 6 may illustrate the Packet-Error-Rate (PER) as a function of Signal-to-Noise-Ratio (SNR) for a plurality of modulation orders, for example Quadrature phase shift keying (QPSK), and Quadrature Amplitude Modulation (QAM) for orders 4 (QAM16) and 6 (QAM64). IDEAL may denote an exemplary scenario without filter mismatch between the I-branch and the Q-branch. Case 212 of FIG. 6 may denote an exemplary scenario with an I-branch and a Q-branch mismatch, and case 212 IQEQ of FIG. 6 may denote an exemplary PER performance by using equalization in accordance with various embodiments of the invention.

As may be seen from FIG. 6, for any modulation order, the IDEAL scenario may perform at lower PER than the case 212 scenario of FIG. 6. In particular, the effect may be significantly more pronounced for higher order modulation, as may be illustrated by comparing no-mismatch QAM64 IDEAL plot 606, with QAM64 case 212 plot 612. By applying an exemplary equalization technique in accordance with various embodiments of the invention, the performance may be improved from QAM64 case 212 plot 612 to QAM64 case 212 IQEQ plot 618. As may be observed, QAM64 case 212 IQEQ plot 618 may be relatively close to the performance that may be achieved without mismatch as illustrated by QAM64 IDEAL plot 606. In some instances, the performance in accordance with various embodiments of the invention may be substantially similar to the performance without mismatch.

Various embodiments of the invention may comprise a machine-readable storage having stored thereon, a computer program having at least one code section for I/Q branch equalization in OFDM systems, at least one code section being executable by a machine for causing the machine to perform shown and described herein and with respect to at least FIG. 1 to FIG. 6.

In accordance with an embodiment of the invention, a method and system for I/Q branch equalization in OFDM systems may comprise determining a transfer function mismatch between an in-phase processing branch, and/or a quadrature processing branch in an OFDM receiver, as described with respect to FIGS. 1B, 2A, and 2B, for example. The determined transfer function mismatch may be compensated for, by applying equalization, for example equalizer 220, after a fast Fourier transform (FFT) 238*b* in an in-phase processing branch and/or a quadrature processing branch, as described with respect to FIG. 2B.

The OFDM system may be compliant with a wireless standard. The wireless standard may comprise UMTS LTE (EUTRA), WiMAX (IEEE 802.16), DVB-H and/or WLAN (IEEE 802.11), as described with respect to FIG. 1A. A transfer function may be measured of an in-phase branch filter and/or a quadrature branch filter for the determining of the transfer function mismatch, as described with respect to FIG. 2B. The transfer function mismatch may be compensated for, in frequency domain by the equalizer 220, for example. The transfer function mismatch may comprise magnitude and/or phase response mismatch, wherein the magnitude and/or phase response mismatch may be a function of frequency. The communication signals may be QPSK, QAM16, and/or QAM64 modulated OFDM signals. A transfer function may be determined and utilized for the equalization, $R(\omega)$, by forming a quotient $$R(\omega) = \frac{H_I(\omega)}{H_Q(\omega)}$$

from a transfer function of the in-phase processing branch, $H_I(\omega)$, and a transfer function of the quadrature processing branch, $H_Q(\omega)$. Also, a transfer function may be determined and utilized for the equalization, $R(\omega)$, by forming a quotient $$R(\omega) = \frac{H_Q(\omega)}{H_I(\omega)}$$

from a transfer function of the in-phase processing branch, $H_I(\omega)$, and a transfer function of the quadrature processing branch, $H_Q(\omega)$, as described with respect to FIG. 2B.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for I/Q branch equalization in OFDM systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
    determining a transfer function mismatch between an in-phase processing branch, and/or a quadrature processing branch, in an OFDM receiver; and
    compensating for said determined transfer function mismatch by applying equalization after a fast Fourier transform (FFT) in an in-phase processing branch and/or an quadrature processing branch, wherein said equalization utilizes a transfer function, $$R(\omega) = \frac{H_I(\omega)}{H_Q(\omega)}$$

from a transfer function of said in-phase processing branch, $H_I(\omega)$, and a transfer function of said quadrature processing branch, $H_Q(\omega)$.

2. The method according to claim 1, wherein said OFDM system is compliant with a wireless standard.

3. The method according to claim 2, wherein said wireless standard comprises UMTS LTE (EUTRA), WiMAX (IEEE 802.16), DVB-H, and/or WLAN (IEEE 802.11).

4. The method according to claim 1, comprising measuring a transfer function of an in-phase branch filter and/or a quadrature branch filter for said determining of said transfer function mismatch.

5. The method according to claim 1, comprising compensating for said transfer function mismatch in frequency domain by said equalizer.

6. The method according to claim 1, wherein said transfer function mismatch comprises magnitude and/or phase response mismatch.

7. The method according to claim 6, wherein said magnitude and/or phase response mismatch is a function of frequency.

8. The method according to claim 1, wherein said communication signals are QPSK, QAM16, and/or QAM64 modulated OFDM signals.

9. A system for processing communication signals, the system comprising: one or more circuits that enables:
    determination of a transfer function mismatch between an in-phase processing branch, and/or a quadrature processing branch, in an OFDM system;
    applying equalization after a fast Fourier transform (FFT) in an in-phase processing branch and/or quadrature processing branch, to compensate for said determined transfer function mismatch, wherein said equalization utilizes a transfer function, $$R(\omega) = \frac{H_I(\omega)}{H_Q(\omega)}$$

from a transfer function of said in-phase processing branch, $H_I(\omega)$, and a transfer function of said quadrature processing branch, $H_Q(\omega)$.

10. The system according to claim 9, wherein said OFDM system is compliant with a wireless standard.

11. The system according to claim 10, wherein said wireless standard comprises UMTS LTE (EUTRA), WiMAX (IEEE 802.16), DVB-H, and/or WLAN (IEEE 802.11).

12. The system according to claim 9, wherein said one or more circuits measure a transfer function of an in-phase branch filter and/or a quadrature branch filter for said determining of said transfer function mismatch.

13. The system according to claim 9, wherein said one or more circuits compensate for said transfer function mismatch in frequency domain by said equalizer.

14. The system according to claim 9, wherein said transfer function mismatch comprises magnitude and/or phase response mismatch.

15. The system according to claim 14, wherein said magnitude and/or phase response mismatch is a function of frequency.

16. The system according to claim 9, wherein said communication signals are QPSK, QAM16, and/or QAM64 modulated OFDM signals.

17. A method for processing communication signals, the method comprising:
    determining a transfer function mismatch between an in-phase processing branch, and/or a quadrature processing branch, in an OFDM receiver; and
    compensating for said determined transfer function mismatch by applying equalization after a fast Fourier transform (FFT) in an in-phase processing branch and/or an quadrature processing branch, wherein said equalization utilizes a transfer function, $$R(\omega) = \frac{H_Q(\omega)}{H_I(\omega)}$$

from a transfer function of said in-phase processing branch, $H_I(\omega)$, and a transfer function of said quadrature processing branch, $H_Q(\omega)$.

18. The method according to claim 17, wherein said OFDM system is compliant with a wireless standard.

19. The method according to claim 18, wherein said wireless standard comprises UMTS LTE (EUTRA), WiMAX (IEEE 802.16), DVB-H, and/or WLAN (IEEE 802.11).

20. The method according to claim 17, comprising measuring a transfer function of an in-phase branch filter and/or a quadrature branch filter for said determining of said transfer function mismatch.

21. The method according to claim 17, comprising compensating for said transfer function mismatch in frequency domain by said equalizer.

22. The method according to claim 17, wherein said transfer function mismatch comprises magnitude and/or phase response mismatch.

23. The method according to claim 22, wherein said magnitude and/or phase response mismatch is a function of frequency.

24. The method according to claim 17, wherein said communication signals are QPSK, QAM16, and/or QAM64 modulated OFDM signals.

25. A system for processing communication signals, the system comprising: one or more circuits that enables:

determination of a transfer function mismatch between an in-phase processing branch, and/or a quadrature processing branch, in an OFDM system;

applying equalization after a fast Fourier transform (FFT) in an in-phase processing branch and/or quadrature processing branch, to compensate for said determined transfer function mismatch, wherein said equalization utilizes a transfer function, $$R(\omega) = \frac{H_Q(\omega)}{H_I(\omega)}$$

from a transfer function of said in-phase processing branch, $H_I(\omega)$, and a transfer function of said quadrature processing branch, $H_Q(\omega)$.

26. The system according to claim 25, wherein said OFDM system is compliant with a wireless standard.

27. The system according to claim 26, wherein said wireless standard comprises UMTS LTE (EUTRA), WiMAX (IEEE 802.16), DVB-H, and/or WLAN (IEEE 802.11).

28. The system according to claim 25, wherein said one or more circuits measure a transfer function of an in-phase branch filter and/or a quadrature branch filter for said determining of said transfer function mismatch.

29. The system according to claim 25, wherein said one or more circuits compensate for said transfer function mismatch in frequency domain by said equalizer.

30. The system according to claim 25, wherein said transfer function mismatch comprises magnitude and/or phase response mismatch.

31. The system according to claim 30, wherein said magnitude and/or phase response mismatch is a function of frequency.

32. The system according to claim 25, wherein said communication signals are QPSK, QAM16, and/or QAM64 modulated OFDM signals.

\* \* \* \* \*